E. E. EASTWOOD.
DETACHABLE SPUR FOR VEHICLE WHEELS.
APPLICATION FILED FEB. 15, 1909.
938,990.
Patented Nov. 2, 1909.
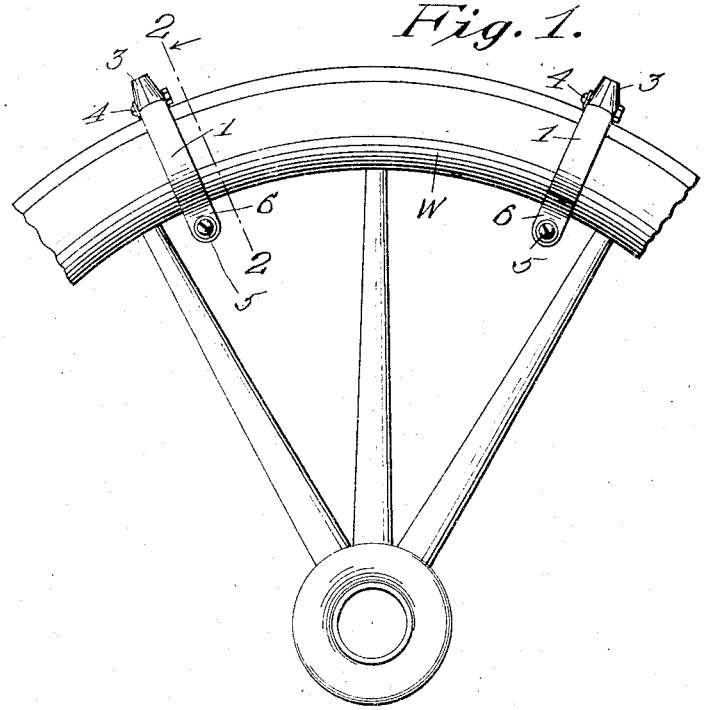
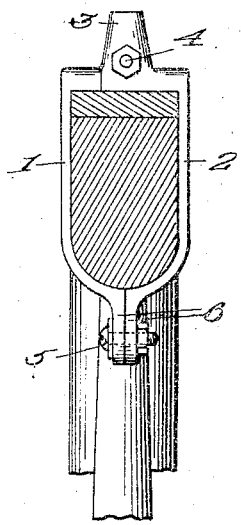
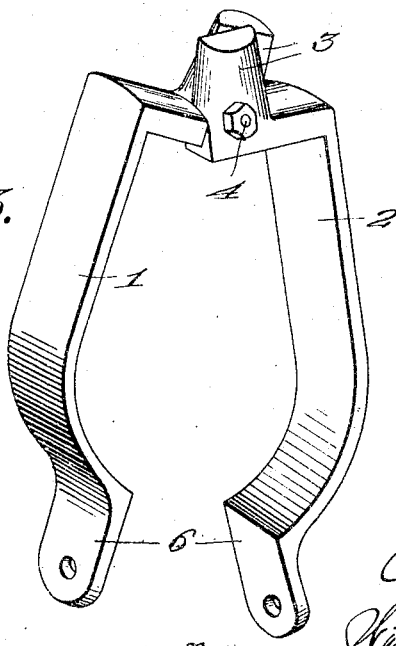
Witnesses
James F. Crown
E. M. Ricketts
Inventor
E. E. Eastwood
Watson E. Coleman
By
Attorney

UNITED STATES PATENT OFFICE.

ERNEST E. EASTWOOD, OF PIPER CITY, ILLINOIS.

DETACHABLE SPUR FOR VEHICLE-WHEELS.

938,990.　　　　Specification of Letters Patent.　　Patented Nov. 2, 1909.

Application filed February 15, 1909. Serial No. 477,860.

*To all whom it may concern:*

Be it known that I, ERNEST E. EASTWOOD, a citizen of the United States, residing at Piper City, in the county of Ford and State of Illinois, have invented certain new and useful Improvements in Detachable Spurs for Vehicle-Wheels, of which the following is a specification, reference being had to the accompanying drawings.

This invention relates to improvements in detachable spurs or calks for use on vehicle wheels to prevent them from slipping or skidding on slippery roads.

The object of the invention is to provide a simple and practical device of this character which may be produced at a small cost, readily applied to and removed from a vehicle wheel and effectively prevent the wheel from slipping.

With the above and other objects in view, the invention consists of the novel features of construction and the combination and arrangement of parts hereinafter fully described and claimed, and illustrated in the accompanying drawings, in which—

Figure 1 is a side view of a portion of a vehicle wheel illustrating the application of the invention thereto; Fig. 2 is a detail section taken on the plane indicated by the line 2—2 in Fig. 1; and Fig. 3 is a perspective view of the attachment removed from the wheel rim and in its open position.

The invention comprises a clamp adapted to take over the wheel rim and to be detachably secured thereto and carrying a calk or spur which projects outwardly or radially from the tread of the wheel so as to enter the road bed and prevent the wheel from slipping or skidding. The clamp is preferably made in two similar half-sections 1, 2 which receive the wheel rim W between them and are formed at their outer ends with overlapping pivotally connected projections 3 which form the spur or calk. The latter may be of any shape but it is preferably of frusto-conical form, as shown, and is divided longitudinally so that the two projections 3 are of semi-frusto-conical-shape. The pivot 4 which unites the clamp members 1, 2 is preferably in the form of a bolt and passes through transverse openings formed in the projections 3 intermediate their ends.

The opposite or free ends of the half-sections 1, 2 are detachably connected by a bolt 5 or other fastening means, said bolt passing through registering openings in the free ends 6 of the half-sections of the clamp, as clearly shown in Fig. 2 of the drawings.

It will be understood that the opposing inner faces of the two half-sections of the clamp may be of such shape as to fit the opposite side faces of the wheel rim and also to engage the outer or tread face of its tire and the inner face of its rim section, and I therefore do not wish to be limited to the precise shape of the clamp sections or members illustrated.

In applying the invention to a wheel rim, the bolt 5 is removed and the two half-sections of the clamp are swung apart to the position shown in Fig. 3 to permit the device to be readily slipped over the rim of a vehicle wheel. When the half-sections are closed upon the rim, the bolt 5 is placed in the ends 6 of said sections and tightened to effectively and detachably secure the attachment to the rim. It will be understood that any number of these attachments or devices may be applied to each wheel and that when applied, as shown in Fig. 1, they will effectively prevent the wheel from slipping sidewise or laterally upon slippery roads.

Having thus described the invention what is claimed is:

A device of the character described comprising a spur divided longitudinally and formed with registering pivot openings, a transverse pivot arranged in said openings, opposing clamp sections formed integral with and projecting from the two portions of the spur, said clamp sections being shaped to receive a wheel rim between them and the free ends of said clamp sections being formed with openings, and a bolt arranged in the openings of the free ends of the clamp sections to detachably secure the device to a wheel rim.

In testimony whereof I hereunto affix my signature in the presence of two witnesses:

ERNEST E. EASTWOOD.

Witnesses:
　LESTER F. SOWERS,
　JACOB STOETLER.